Sept. 22, 1936.　　　　　　W. OWEN　　　　　　2,054,864
APPARATUS FOR LAMINATING GLASS
Filed Feb. 19, 1934　　　　3 Sheets-Sheet 1

INVENTOR

Sept. 22, 1936.     W. OWEN     2,054,864
APPARATUS FOR LAMINATING GLASS
Filed Feb. 19, 1934     3 Sheets-Sheet 2
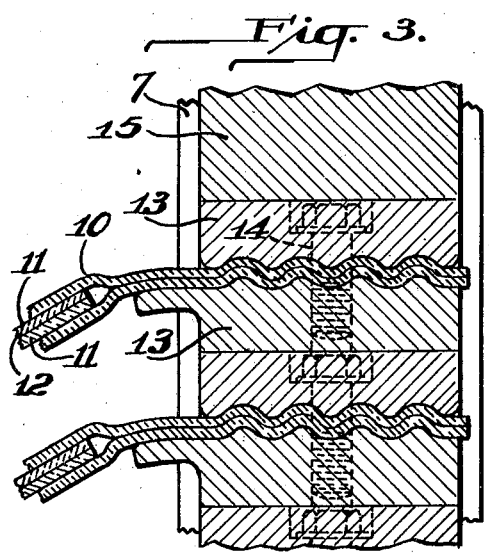
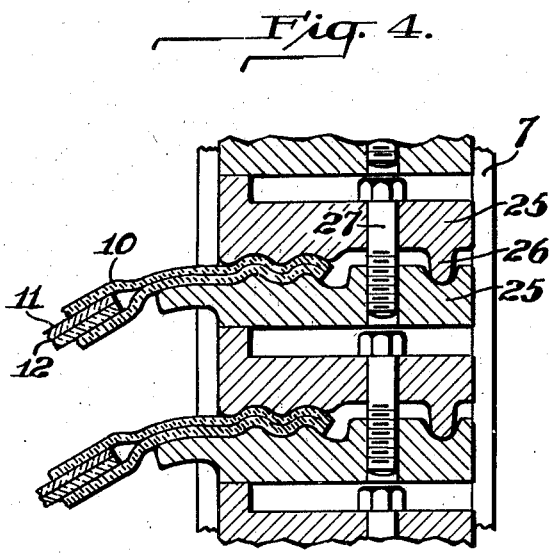
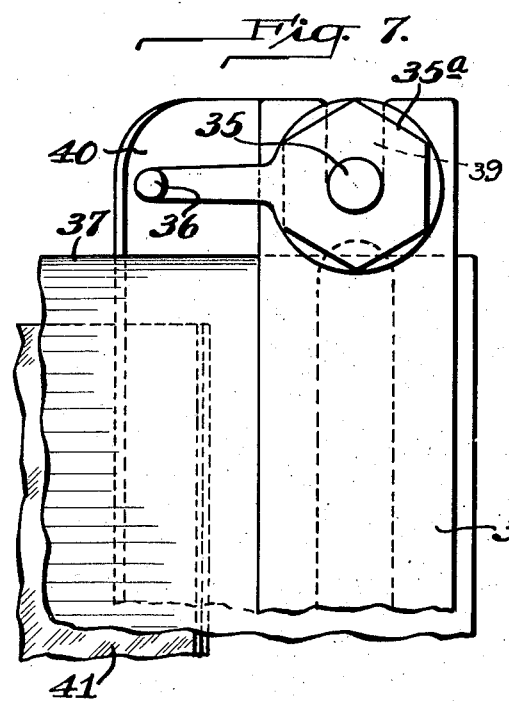
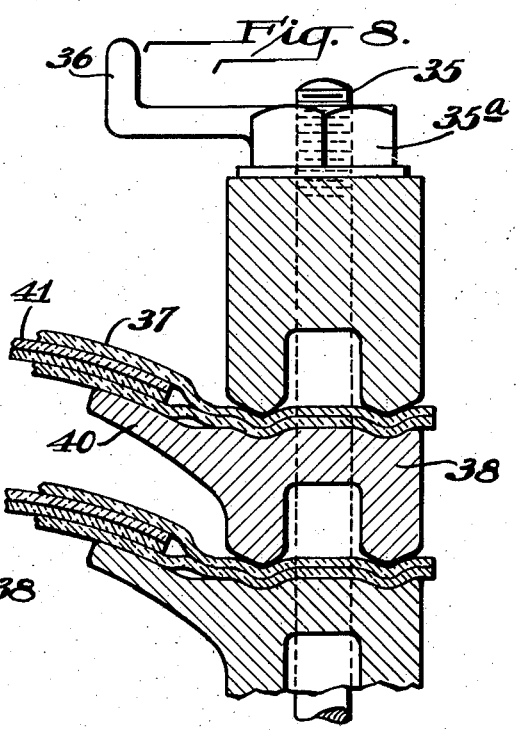
INVENTOR
Wm Owen
By
Bradley & Bee
Attys Sept. 22, 1936.      W. OWEN      2,054,864
APPARATUS FOR LAMINATING GLASS
Filed Feb. 19, 1934      3 Sheets-Sheet 3

INVENTOR
Wm Owen
By
Bradley + Bee

Patented Sept. 22, 1936

2,054,864

UNITED STATES PATENT OFFICE 2,054,864

APPARATUS FOR LAMINATING GLASS

William Owen, Pittsburgh, Pa., assignor to Pittsburgh Plate Glass Company, a corporation of Pennsylvania Application February 19, 1934, Serial No. 711,859

5 Claims. (Cl. 18—17)

Figure 1:
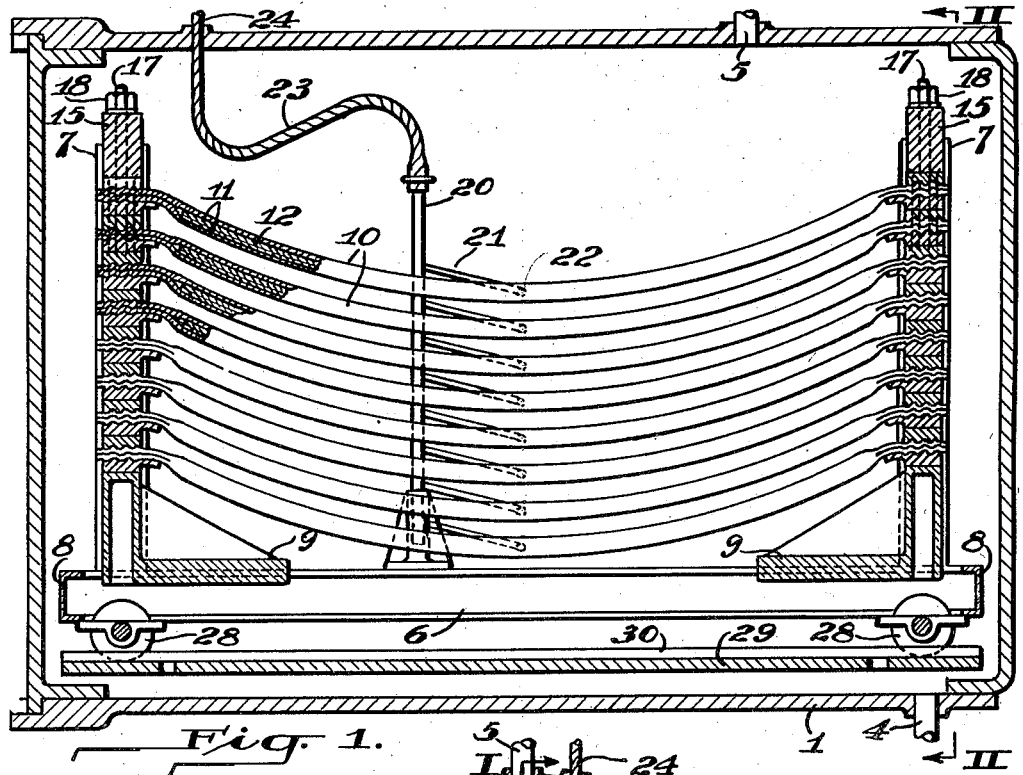
Figure 2:
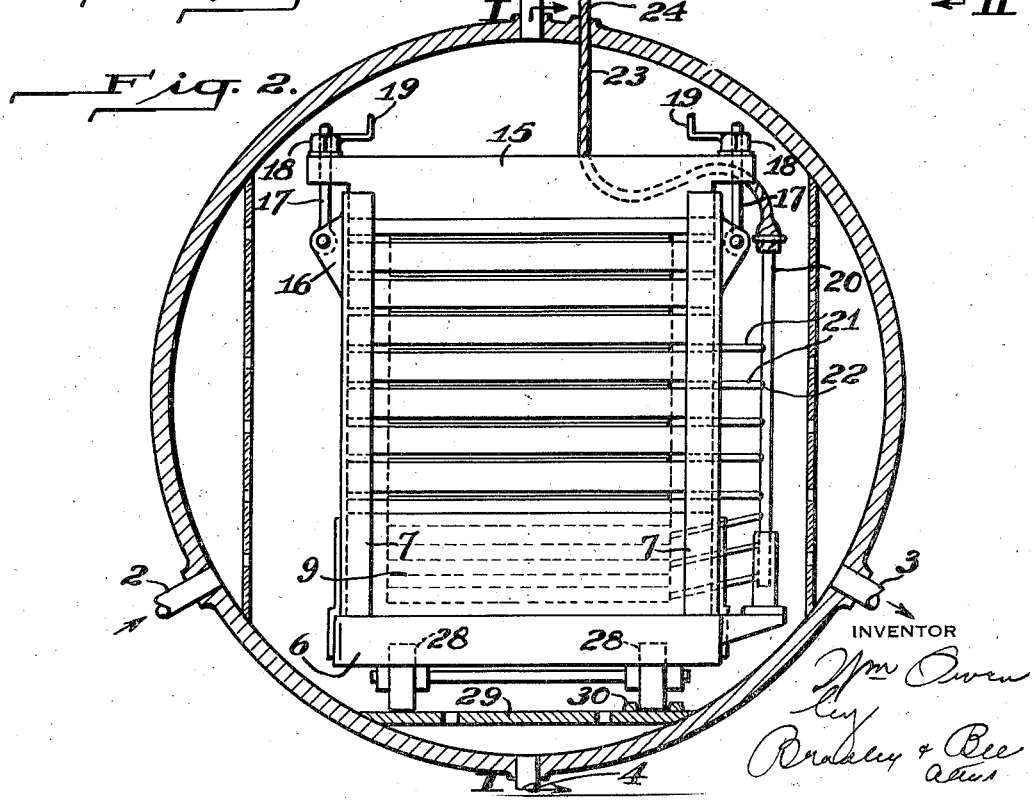
Figure 5:
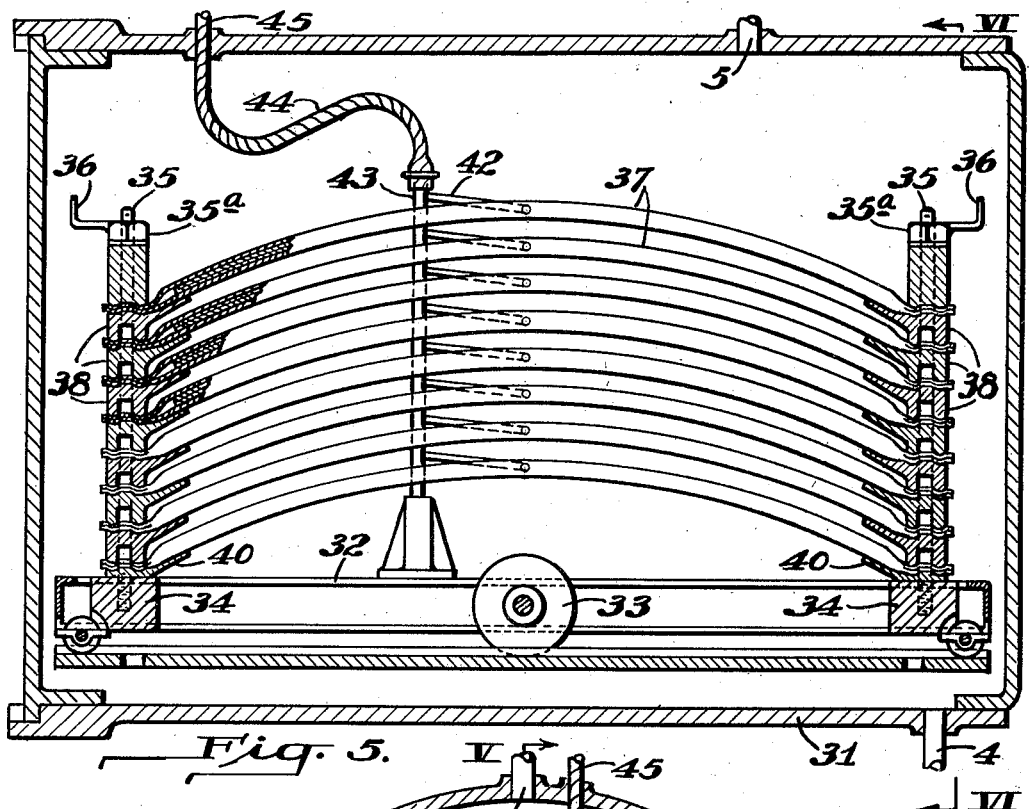
Figure 6:
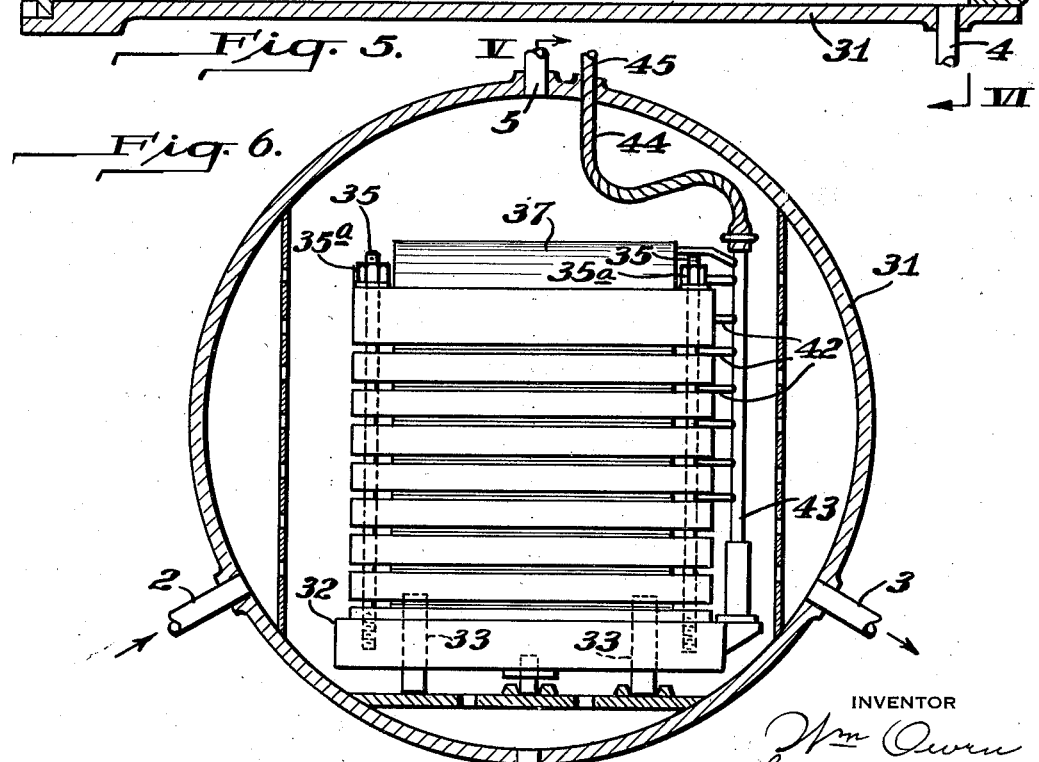

The invention relates to apparatus for making safety glass, which consists of a pair of glass sheets with an interposed sheet of reinforcing material, such as cellulose plastic. The apparatus is particularly designed for preliminarily compositing curved safety glass, but may be used for the complete pressing operation. It has for its principal object the provision of a compact apparatus for compositing or laminating a plurality of sets of sheets at one time, in the use of which a minimum of time and effort is required in loading and unloading the rubber containers for the sets of sheets, and in clamping and unclamping such containers, and in which a very secure clamping means for the containers is provided. Briefly stated, the invention involves the use of a plurality of containers or bags of rubber (for the sets of sheets to be laminated) open at both ends, and clamping means for the ends of the bags so arranged that when the set of bags is arranged in parallel and above the other, a single clamping means at each end of the set serves to clamp all of such ends. Certain embodiments of the invention are illustrated in the accompanying drawings, wherein:

Figure 1 is a section on the line I—I of Fig. 2. Fig. 2 is a section on the line II—II of Fig. 1; Fig. 3 is an enlarged detail section showing the clamping means at the ends of the containers or bags; Fig. 4 is a view similar to Fig. 3 showing modifications; Fig. 5 is a section through a modification, such section being taken on the line V—V of Fig. 6; Fig. 6 is a section on the line VI—VI of Fig. 5. And Figs. 7 and 8 are enlarged detail views, Fig. 7 being a plan view and Fig. 8 a section through the clamping means for the bags of the Figs. 5 and 6 construction.

Referring to Figs. 1, 2, and 3; I is an autoclave or tank filled with a suitable pressing liquid, preferably a high boiling solvent, such as diethylene glycol. This tank is provided with means for circulating the liquid comprising an inlet pipe 2 and an outlet pipe 3, such pipes being connected with a suitable heat exchange apparatus, which is not shown. During the pressing operation, a heating fluid is circulated through the tank, and after the pressing operation is completed, a cooling fluid may be circulated so that the laminated glass in the tank may then be removed at a lower temperature. The tank is also provided with a suitable drain 4 and an air inlet pipe 5 to facilitate the draining, such pipes being closed during the normal operation of the apparatus.

The apparatus for carrying the rubber bags, in which the glass sheets are composited comprises a frame consisting of a base member 6 and a pair of guide members 7, 7 at each end of the base member. The base member is in the form of I-beams connected at their ends by the channels 8, 8, while the guide members 7, 7 are in the form of channels. The guide members 7, 7 are provided with feet 9, 9 welded or otherwise secured to the channels 7, 7, and having their lower ends formed so as to surround the upper flanges of the I-beams. This provides for the adjustment of the two pairs of guide members toward and from each other to adapt the apparatus for use with bags of different lengths, depending upon the size of the product which is to be laminated.

The bags or containers 10 are open at both ends to facilitate the insertion and removal of the sets of curved sheets which are to be laminated. This arrangement makes it much easier to insert a set of sheets and remove them, than if the bag was open only at one end. As indicated in Fig. 3 each set of sheets comprises the glass plates 11, 11 with an interposed sheet of cellulose plastic 12, the faces of the glass sheets being provided with suitable cementing material before the sandwich, consisting of the three sheets, is assembled.

In order to securely close the bags at each end, a pair of clamping plates 13, 13 is provided, preferably having opposed corrugated surfaces, and these plates are secured together by suitable bolts 14, which are threaded into the lower member 13. The plates 13, 13 are of such length and shape that they fit slidably between the channels 7, 7 which thus constitute guideways for the plates. After the assembled sheets of glass and reinforcing are placed in the bag, the clamping members 13, 13 are then applied and fitted into the upper ends of the channels 7, 7, the clamping plates sliding down until they come to rest at the bottom of the channel. Each succeeding bag with its sandwich to be laminated is inserted in the apparatus in the same manner until the entire set has been brought into assembled relation, as indicated in Figs. 1 and 2. The clamping members 15, 15 are then applied as indicated in Figs. 1 and 2. At each of the upper ends of the channels 7, 7 is a bracket 16 to which is pivoted a clamping bolt 17. These bolts fit into slots in the ends of the members 15, 15 and carry at their upper ends the clamping nuts 18 having the handles 19. By turning the handles, the nuts are screwed down applying clamping pressure to the members 15, 15, which clamping pressure is transmitted to the clamping plates 13, 13 so that the necessary pressure is applied to the ends of the bags to insure a tight joint. It will be understood that the bolts 14 which clamp each pair of clamping plates 13, 13 together are merely tightened sufficiently to permit of easy handling in applying the bags to the channels 7, 7.

The base member 6 is provided with a vacuum header 20 and a plurality of flexible connections 21 detachably secured at 22 to nipples extending through the walls of the rubber bags. The header is connected by means of the flexible pipes 23 and 24 to a suitable exhausting device, so that preliminary to and during the pressing operation, air is exhausted from the interior of the bags, this being a condition which is known in the art to be desirable. The clamping connections at the ends of the bags, as heretofore described, insures against the loss of vacuum preliminary to the pressing operation and prevents any ingress of liquid from the tank 1 to the interior of the bags during the pressing operation.

After the apparatus is assembled and placed in the tank, as indicated in Figs. 1 and 2, the tank is closed and filled with the pressing liquid which is brought up to a temperature of about 240 degrees F., such temperature being maintained during the pressing operation. The pressure which is applied to the liquid will vary, depending upon whether the pressing is a preliminary one to be followed by a final pressing in a hydraulic tank, as set forth in Sherts and Hamill Patent No. 1,781,084, or whether the operation is designed to complete the lamination of the glass. In the first case, the pressure need not run above twenty or thirty pounds, but in the latter case about 150 pounds per square inch is required.

Fig. 4 illustrates a modified arrangement for clamping the ends of the bags 10. The clamping plates 25 are somewhat different in shape, but fit removably in the channels 7, 7 constituting the guide members, the same as in the construction of Figs. 1, 2, and 3. The clamping plates are in this case pivoted together at their outer edges, as indicated at 26, and the clamping bolts 27 are applied intermediate the ends of the bags and the fulcrum points 26. If desired, the bolts 27 may be screwed down sufficiently to make the ends of the bags tight without resorting to the use of the members 15, 15 and the clamping devices cooperating therewith. If desired, when this construction is used, the bags may be evacuated after the clamping members 25, 25 are applied and before the bags are placed in the guide channel 7, 7. In order to facilitate the movement of the bag carrying device, the base member 6 is preferably provided with the wheels 28, 28 which are guided into the tank on the floor 29 by means of the guide strips 30.

Figs. 5 to 8 illustrate a modification in which the tank 31 and equipment is similar to the tank 1 heretofore described, the difference relating to the apparatus for supporting and clamping the rubber bags which carry the sheets to be laminated. In this case, the base member comprises a pair of channels 32, 32 provided with a pair of wheels 33. Mounted slidably between the channels are a pair of blocks 34, 34 which carry the guide members for the clamping devices, such guide members in the present case comprising a pair of spaced rods 35 which are screwed at their lower ends into the blocks 34. These rods are threaded at their upper ends and carry the nuts 35a provided with the handles 36. In this form of apparatus the rubber bags 37 are similar to those heretofore described, being open at both ends, but are positioned so that the sheets to be laminated have their convex sides facing up instead of facing down. The clamping members in this case, consist of transverse members 38 placed one above the other, as indicated in Fig. 8 and having their ends slotted as indicated at 39 (Fig. 7) so as to receive the clamping rods 35. Each of the clamping members 38 is provided with an inwardly extending flange 40 which projects in far enough to lie beneath the edges of the glass sheets 41, so that the sheets and the bags which carry the sheets are supported independent of any gripping effect applied by the members 38. After the sandwiches are placed in the rubber bags they are applied one after the other from the bottom up, and, as each bag is placed in position, a clamping member is placed over its edges with its ends guided by the rods 35. After the entire series has been assembled, as indicated in Fig. 5, the handles 36 are turned thus applying clamping pressure to the entire series of clamping members 38. The vacuum pipes 42 are now connected to the bags and air is exhausted from the header 43 by means of the connections 44 and 45. The tank 31 is now closed and the heating and pressing liquid is applied in the same manner, as heretofore described in connection with the apparatus of Figs. 1 to 3.

What I claim is:

1. In combination in apparatus for making laminated glass, a frame comprising a base and a pair of upright parallel guide members at each end thereof, a series of clamping plates one above the other, each free to move independently of the others guided between each pair of guide members, a series of rubber containers or bags for the sets of sheets to be laminated open at both ends positioned in parallel above the base with their open ends between the clamping plates, and means for applying clamping pressure to each series of clamping plates.

2. In combination in apparatus for making laminated glass, a frame comprising a base and a pair of upright parallel guide members at each end thereof, a series of clamping plates one above the other, each free to move independently of the others guided between each pair of guide members, a series of rubber containers or bags for the sets of sheets to be laminated open at both ends positioned in parallel above the base with their open ends between the clamping plates, means for applying clamping pressure to each series of clamping plates, an exhaust header, and a connection from each of the bags to said header.

3. In combination in apparatus for making laminated glass, a frame comprising a base and a pair of upright parallel guide members at each end thereof, a series of clamping plates one above the other, each free to move independently of the others guided between each pair of guide members, a series of rubber containers or bags for the sets of sheets to be laminated open at both ends positioned in parallel above the base, each bag having its ends between a pair of said clamping plates, means for clamping each of said pairs of plates together, and other means whereby clamping pressure is applied to all the members of each series of plates.

4. In combination in apparatus for making laminated glass, a frame comprising a base and a pair of upright parallel guide members at each end thereof, one of which pairs is slidingly mounted for adjustment on said base toward and from the other pair, a series of clamping plates one above the other, each free to move independently of the others guided between each pair of guide members, a series of rubber containers or bags for the sets of sheets to be laminated open at both ends positioned in parallel above the base with their open ends between the clamping plates, and means for applying clamping pressure to each series of clamping plates.

5. In combination in apparatus for making laminated glass, a frame comprising a base and a pair of upright parallel guide members at each end thereof, a series of clamping plates one above the other, each free to move independently of the others guided between each pair of guide members, a series of rubber containers or bags for the sets of sheets to be laminated open at both ends positioned in parallel above the base with their open ends between the clamping plates and each provided with an inwardly projecting flange adapted to lie beneath and support the edges of the glass sheets in the bag, and means for applying clamping pressure to each series of clamping plates.

WILLIAM OWEN.